United States Patent
Connelly et al.

(10) Patent No.: US 9,702,025 B2
(45) Date of Patent: Jul. 11, 2017

(54) METHOD FOR THE EXTRACTION AND RECOVERY OF VANADIUM

(75) Inventors: Damian Edward Gerard Connelly, South Perth (AU); Denis Stephen Yan, Morley (AU); Sai Wei Lam, Perth (AU)

(73) Assignee: TNG Limited, Subiaco (AU)

( * ) Notice: Subject to any disclaimer, the term of this patent is extended or adjusted under 35 U.S.C. 154(b) by 0 days.

(21) Appl. No.: 13/698,452

(22) PCT Filed: May 5, 2011

(86) PCT No.: PCT/AU2011/000519
§ 371 (c)(1),
(2), (4) Date: Feb. 4, 2013

(87) PCT Pub. No.: WO2011/143689
PCT Pub. Date: Nov. 24, 2011

(65) Prior Publication Data
US 2013/0125708 A1    May 23, 2013

(30) Foreign Application Priority Data
May 19, 2010   (AU) ............................. 2010902191

(51) Int. Cl.
C22B 34/22     (2006.01)
C22B 3/26      (2006.01)
(Continued)

(52) U.S. Cl.
CPC ............ *C22B 34/22* (2013.01); *C22B 3/0005* (2013.01); *C22B 3/0066* (2013.01); *C22B 3/10* (2013.01); *Y02P 10/234* (2015.11)

(58) Field of Classification Search
USPC ......................................... 423/63, 64, 68, 62
See application file for complete search history.

(56) References Cited

U.S. PATENT DOCUMENTS 3,151,933 A * 10/1964 Hazen et al. ................... 423/63
RE29,598 E     3/1978 Bare et al.
(Continued)

OTHER PUBLICATIONS

CYTEC, CYANEX 923 Extractant—Solvent Extraction Reagent, retried from Internet <URL: http://www.cytec.com/specialty-chemicals/PDFs/TransformationalSynthetic/CYANEX%20923.pdf>, published May 4, 2009. 16 pages.

*Primary Examiner* — Melissa Swain
(74) *Attorney, Agent, or Firm* — Rothwell, Figg, Ernst & Manbeck, P.C.

(57) ABSTRACT

A method (10) for the extraction and recovery of vanadium from its ores, the method (10) characterised by the steps of: (i) Acid leaching (12) of an ore containing vanadium and iron to extract vanadium and iron into solution; (ii) Passing the product (78) of the leach step (i) to a solid/liquid separation step (80); (iii) Passing the liquid product (82) of separation step (ii) to a solvent extraction step (14) in which vanadium and iron are extracted into an organic extractant from that liquid product; (iv) Passing the loaded organic extractant produced in step (iii) to a stripping step (16, 18) in which acid is used to selectively and sequentially strip the vanadium and iron from the organic extractant; and (v) Passing the vanadium containing strip solution of step (iv) to a recovery step (104).

20 Claims, 13 Drawing Sheets

(51) Int. Cl.
    *C22B 3/38*    (2006.01)
    *C22B 3/10*    (2006.01)

(56) References Cited

U.S. PATENT DOCUMENTS

| | | | | |
|---|---|---|---|---|
| 4,172,878 A | * | 10/1979 | Tolley | 423/83 |
| 4,321,236 A | * | 3/1982 | Stambaugh | C01G 23/0536 |
| | | | | 423/82 |
| 5,188,736 A | * | 2/1993 | Pen et al. | 210/634 |

* cited by examiner

METHOD FOR THE EXTRACTION AND RECOVERY OF VANADIUM

CROSS REFERENCE TO RELATED APPLICATIONS

This application is a 35 U.S.C. §371 National Phase Entry Application from PCT/AU2011/000519, filed May 5, 2011, and designating the United States, which claims priority under 35 U.S.C. §119 to Australian Patent Application No. 2010902191filed May 19, 2010, which is incorporated herein in its entirety.

FIELD OF THE INVENTION

The present invention relates to a method for the extraction and recovery of vanadium. More particularly, the method of the present invention utilises a hydrometallurgical route for the extraction of vanadium from its ores.

BACKGROUND ART

Traditionally, vanadium is extracted and recovered from its ores through a pyrometallurgical process that involves a salt roasting step followed by water leaching. Environmental concerns are becoming of increasing importance to those wishing to establish new mineral processing operations and those processes that require roasting more often than not emit products that have an overwhelmingly negative environmental impact.

Hydrometallurgical options for the extraction and recovery of vanadium from its ores have not been explored to date, as a rule, as a result of difficulties in both the leach step and the recovery step. With regard to leach and recovery, iron is typically co-extracted with the vanadium, and titanium is often also present, such as may be found in titanomagnetite type ores.

This results in concerns regarding selectivity of any leach and recovery processes. Iron is co-extracted with vanadium in the acid leaching since vanadium is locked as solid solution within the titanomagnetite matrix. Minimising the dissolution of iron in acid leaching is often a challenge without sacrificing the extraction efficiency of vanadium.

Solvent extraction requires that the solution pH be adjusted prior, to the solvent extraction step. This often results in the co-precipitation of iron and vanadium.

Remya et al (Remya et al., *Solvent Extraction and Ion Exchange*, Vol. 21., No. 4. pp. 573-589, 2003) conducted a study for solvent extraction of vanadium using Cyanex 923. However, there is no disclosure of a full process from leaching to purification step by solvent extraction and stripping and the recovery of vanadium by precipitation. Furthermore, multiple stripping agents are required which may involve extra processing cost in a full scale operation.

Additionally, any potential for economic viability of a hydrometallurgical route for the extraction and recovery of vanadium, and any associated valuable metals, has not been demonstrated.

The method of the present invention has as one object thereof to overcome substantially the abovementioned problems of the prior art, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a method for the extraction and recovery of vanadium from its ores, the method characterised by the steps of:
  (i) Acid leaching of an ore containing vanadium and iron to extract vanadium and iron into solution;
  (ii) Passing the product of the leach step (i) to a solid/liquid separation step;
  (iii) Passing the liquid product of separation step (ii) to a solvent extraction step in which vanadium and iron are extracted into an organic extractant from that liquid product;
  (iv) Passing the loaded organic extractant produced in step (iii) to a stripping step in which acid is used to selectively and sequentially strip the vanadium and iron from the organic extractant; and
  (v) Passing the vanadium containing strip solution of step (iv) to a recovery step.

In one form of the present invention the ore contains titanium in addition to vanadium and iron.

The acid leaching of step (i) is preferably conducted using hydrochloric acid (HCl).

More preferably, the concentration of HCl is within the range of about 20% to 32% (w/w).

Still preferably, the acid leaching is conducted in the range of about 25° C. to 80° C. under atmospheric pressure. The residence time of the acid leaching is preferably between about 30 to 360 minutes. The solids content during acid leaching is preferably about 20% w/w.

Preferably, the organic extractant of step (iii) contains a phosphine oxide.

Still preferably, the phosphine oxide is Cyanex 923™.

Yet, still preferably, the extractant comprises about 40% v/v Cyanex 923™ and 60% v/v organic solvent.

Preferably, the aqueous to organic ratio during the solvent extraction step (iii) is between about 1:1 to 1:20. More preferably, the aqueous to organic ratio during the solvent extraction step (iii) is about 1:5.

Still preferably, the stripping step (iv) is conducted in a counter-current manner whereby vanadium is stripped from the loaded organic extractant prior to the stripping of iron from that solution.

Preferably, the acid used in the strip of step (iv) is hydrochloric acid. The hydrochloric acid is preferably in a concentration of between about 2 to 4 M when stripping vanadium. The hydrochloric acid is preferably in a concentration of about 0.01 M when stripping iron.

The purity of the vanadium solution produced is preferably between about 76% to 95%. The purity of the iron solution produced is preferably about 99%.

DESCRIPTION OF THE DRAWINGS

The present invention will now be described, by way of example only, with reference to one embodiment thereof and the accompanying drawings, in which:—

BEST MODE(S) FOR CARRYING OUT THE INVENTION

Figure 1:
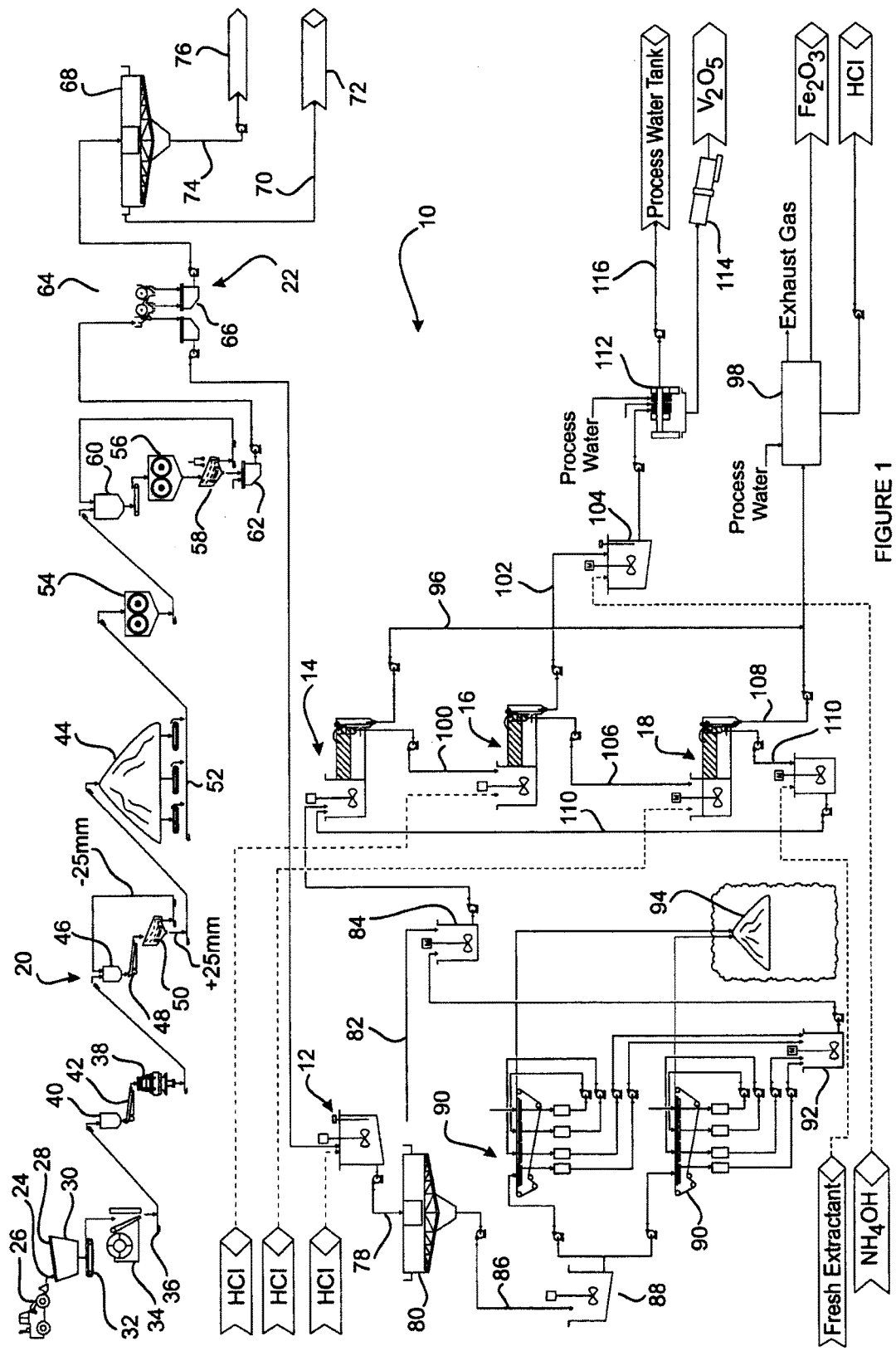
FIG. 1 is a flow sheet depicting a method for the extraction and recovery of vanadium from its ores in accordance with the present invention.

In FIG. 1 there is shown a method 10 for the extraction and recovery of vanadium from its ores in accordance with the present invention. The method 10 comprises a leach step 12, solvent extraction step 14, vanadium stripping step 16 and iron stripping step 18.

Prior to the leach step 12 there are provided both a crushing circuit 20 and a beneficiation circuit 22. The purpose of the crushing and beneficiation circuits 20 and 22 are to produce a crushed ore with a size that is amenable for hydrometallurgical processing.

A run-of-mine (ROM) material 24 is delivered by front end loader 26 and dumped onto a 600 mm aperture static grizzly 28 mounted over a ROM bin 30. Oversize material is scalped on the grizzly 28. Scalped ROM ore is discharged from the bin 30 using a variable speed apron feeder 32 and directed to a jaw crusher 34.

The jaw crusher 34 reduces the top-size of the incoming material to about −250 mm. The crushed ore is discharged onto a crusher discharge conveyor 36, which extends underneath the apron feeder 32 to collect any spillages therefrom.

The crushed ore is then conveyed into a cone crusher 38 equipped with a feed bin 40 and vibrating feeder 42. The crushed ore from the cone crusher 38 is then transported to a stockpile 44, with a capacity of 24 hours, by way of a feed bin 46, vibrating feeder 48 and a screen 50. Crushed ore is drawn from the stockpile 44 by a stockpile discharge conveyor 52 and transported to two high pressure grinding rolls (HPGR) 54 and 56, arranged in series.

The use of the HPGR is understood to produce microcracks in the ore particles which allows for a significant increase in subsequent lixiviant penetration and metal recovery in leaching over conventional milling.

The final stage of HPGR 56 is operated in closed circuit with a screen 58 cutting at 1 mm. The oversize from the screen 58 is returned to a feed bin 60 for further grinding to improve the liberation of the valuable minerals. The screen undersize material is transferred into a feed hopper 62 for a subsequent counter current rougher magnetic separator 64, being a part of the beneficiation circuit 22. Process water is added and the slurry is pumped to the rougher magnetic separator 64. The crushed ore is beneficiated using counter current magnetic separator before the concentrate is pumped to the leaching step 12.

It is envisaged that an additional grinding step may be utilised to produce a product that is about minus 150 μm, depending upon the level of titanium preferred in the residue of the leaching step 12. The smaller the ore is when passed to the leaching step 12 the higher the relative level of titanium in the leach residue.

Tails 66 from the rougher magnetic separator 64 are pumped to a tailings thickener 68 where process water is recovered for reuse. The slurry is thickened to 60% solids by weight. Thickener overflow 70 gravitates to a process water tank 72 while underflow 74 is pumped to tailings 76. The magnetic concentrate is pumped to the leaching circuit for the extraction of vanadium and iron.

The purpose of the leach step 12 is to extract the valuable metal species of vanadium and iron into solution. The leaching step 12 is conducted in rubber lined, epoxy coated, agitated steel tanks arranged in series. The slurry is cascaded through the acid leach train. Hydrochloric acid is added to a first tank to adjust the pulp density to 20% solid by weight. The acid leaching is conducted at a temperature of between about 25° C. to 85° C., for example 80° C., under atmospheric pressure or above, and for a residence time of between about 30 to 360 minutes. The initial HCl concentration is maintained at between about 20% to 32% w/w, for example at 20% w/w. The leach temperature is able to be controlled at about 80 to 85° C. through insulation and capping of the leach tanks.

The leaching reactions are represented by the equation below:

$$Fe_3O_4 + 8HCl \rightarrow 2FeCl_3 + FeCl_2 + 4H_2O$$

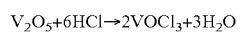

$$V_2O_5 + 6HCl \rightarrow 2VOCl_3 + 3H_2O$$

A slurry 78 from the leach step 12 is pumped to a leach thickener 80 in which the slurry is thickened to 50% solids by weight. An overflow solution 82 is gravitated to an agitated metal extraction feed tank 84. An underflow solution 86 is pumped to a feed tank 88 and in turn to two horizontal belt filters 90 arranged in parallel. Here the leach residue is washed in a counter current manner using fresh water.

Mother liquor and wash filtrate from the filters 90 are pumped to a wash water tank 92 before it is transferred to the metal extraction feed tank 84 and the solvent extraction step 14. The leach residue cake from the filters 90 is stockpiled 94 and it is envisaged that this leach residue cake may be used as an ilmenite concentrate.

This purpose of the solvent extraction step 14, the vanadium stripping step 16 and iron stripping step 18 are to extract the valuable metal units from the leach solution in a sequential manner using the appropriate extractant and stripping agents.

From the metal extraction feed tank 84, the pregnant solution is fed to the solvent extraction step 14 in which it mixed with an organic extractant, for example a phosphine oxide. Specifically, the extractant is provided in the form of a mix of 40% v/v Cyanex 923™ in 60% v/v kerosene. The extraction is conducted at an organic to aqueous (0:A) ratio of between about 1:1 to 20:1, for example 5:1. In this step, vanadium and iron are co-extracted onto the organic phase. It should be noted that about 61% of the iron is loaded onto the organic. A barren. effluent 96, which carries the remaining iron solution, is transferred to an acid regeneration plant 98.

A metals loaded organic 100 is then transferred into a stripping plant, in which the vanadium and iron are selectively separated. The stripping is conducted in a sequential manner involving selective stripping of vanadium followed by iron.

Stripping is conducted in a counter-current fashion within each step 16 and 18. The vanadium is stripped from the metal loaded organic using HCl of. between about 2.5 M to 5 M, for example 4M HCl. This produces a vanadium enriched solution 102 having a purity of about 81%. The vanadium enriched solution is then pumped to a recovery step, for example a vanadium precipitation circuit 104 for the production of vanadium pentoxide ($V_2O_5$).

Metal loaded organic 106 from the vanadium stripping step 16 is then contacted with HCl of between about 0.01M to 0.05M, for example 0.01M HCl, in the iron stripping step 18. An iron enriched solution 108 at a purity of about 99% is recovered. The iron enriched solution 108 is pumped to the acid regeneration plant 98, while regenerated organic extractant 110 is recycled 110 back to the metal extraction step 14 for reuse.

Ammonium chloride is used as the precipitating agent in the vanadium precipitation circuit 104. Vanadium is precipitated as ammonium metavanadate:

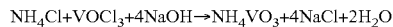

After a filtration step 112, the ammonium metavanadate is calcined using a rotary kiln 114 operating at about 500-550° C., to dry the product, removing the water of crystallisation and to convert the filter cake to vanadium pentoxide ($V_2O_5$). The dry vanadium pentoxide is then packaged for transportation. Filtrate 116 from the filter step 112 is pumped into the process water tank for reuse.

The barren effluent 96 from the solvent extraction step 14 together with the iron enriched solution 108 from the iron stripping step 18 is pumped into the acid regeneration plant 98. The acid regeneration process utilises pyrohydrolysis and is understood to proceed according to the following reactions:

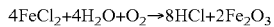

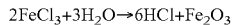

It is to be understood that other processes for the regeneration of acid may be utilised without departing from the scope of the present invention.

Regenerated acid at a strength of 20% w/w is collected and pumped back to the hydrochloric acid feed tank, while the iron oxide can be sold as a valuable product.

The method 10 of the present invention will now be described with reference to several non-limiting examples.

A metallurgical test work programme was based on an ore from the Mount Peake project in the Northern Territory of Australia, the project having an Inferred Resource of 140 Mt @ 0.30% $V_2O_5$, 5.9% $TiO_2$ and 29% iron.

A vanadium rich concentrate ($P_{80}$ 150 μm, 75 μm and 45 μm) from a cleaner magnetic separation process was subjected to acid leaching to examine the impact of grind size, solids content and acid concentration. The composition of the vanadium rich concentrate is as depicted in Table 1:

TABLE 1

| Grind Size | Concentrate Grade (%) | | | | | | |
|---|---|---|---|---|---|---|---|
| (mm) | Fe | $V_2O_5$ | $TiO_2$ | $SiO_2$ | $Al_2O_3$ | P | S |
| 150 | 51.7 | 1.10 | 15.8 | 5.30 | 3.0 | 0.013 | 0.03 |
| 75 | 55.3 | 1.19 | 16.5 | 2.07 | 2.5 | 0.004 | 0.03 |
| 45 | 55.4 | 1.18 | 16.3 | 2.12 | 2.4 | 0.005 | 0.03 |
| Head Assay | 34.5 | 0.54 | 9.2 | 22.9 | 5.0 | 0.08 | 0.03 |

The leaching in these tests was conducted at ambient or room temperature (about 25° C.) using hydrochloric acid as the lixiviant.

To study the effect of HCl concentration, the lixivant was set at 20 wt. % HCl and 10 wt. % HCl.

Unless stated, the initial solids content fixed at 20% w/w. The leach kinetics was allowed to take place for 4 hours. Samples were collected intermittently for assay analysis.

Figure 2:
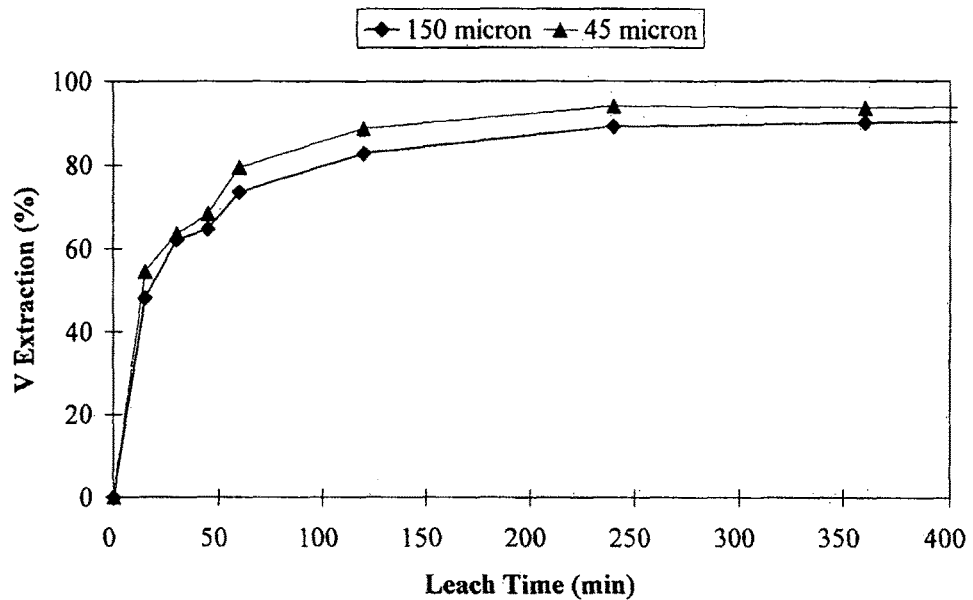
FIG. 2 is a graph of the extraction of vanadium over various leach times at grind sizes of 45 μm and 150 μm.
Figure 3:
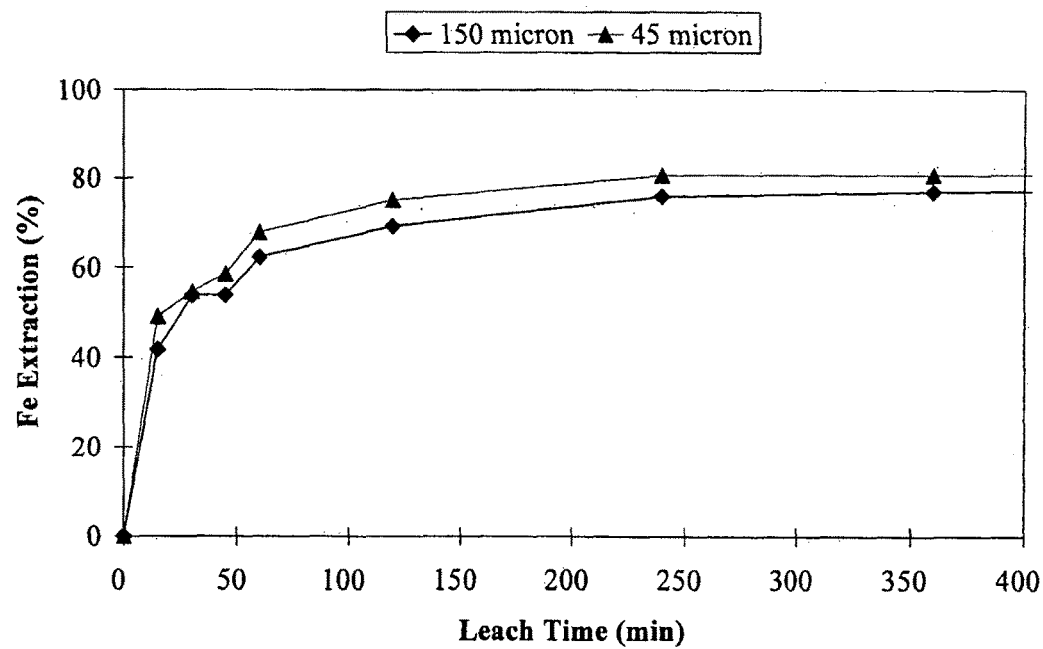
FIG. 3 is a graph of the extraction of iron over various leach times at grind sizes of 45 μm and 150 μm.
Figure 4:
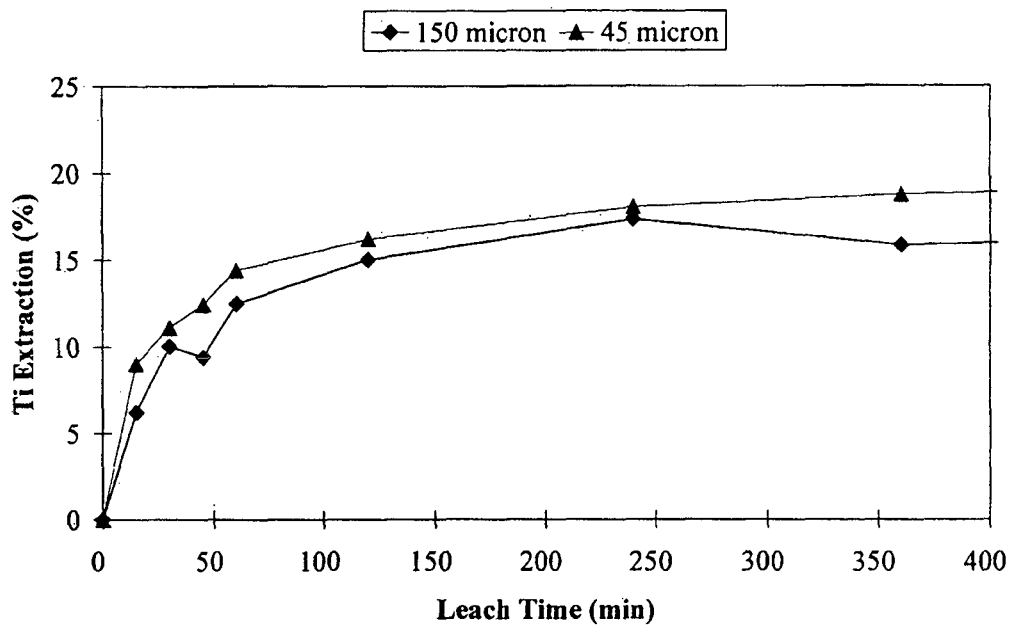
FIG. 4 is a graph of the extraction of titanium over various leach times at grind sizes of 45 μm and 150 μm.

The vanadium rich concentrate was amenable to acid leaching yielding a vanadium extraction greater than 90%. Co-extraction of iron and titanium was also recorded at 77-81% and 16-19%, respectively. Reducing the grind size from $P_{80}$ 150 μm. to 45 μm only affected the leach kinetics mildly, as can be seen with reference to FIGS. 2, 3 and 4.

These results showed that good control of the $SiO_2$ to $Al_2O_3$ mass ratio is not critical in the hydrometallurgical processing to achieve a high extraction of vanadium.

Analysis of the leach residue showed an upgrade in the $TiO_2$ grade from 16.6-16.8% to 38.3-43.5%.

Figure 5:
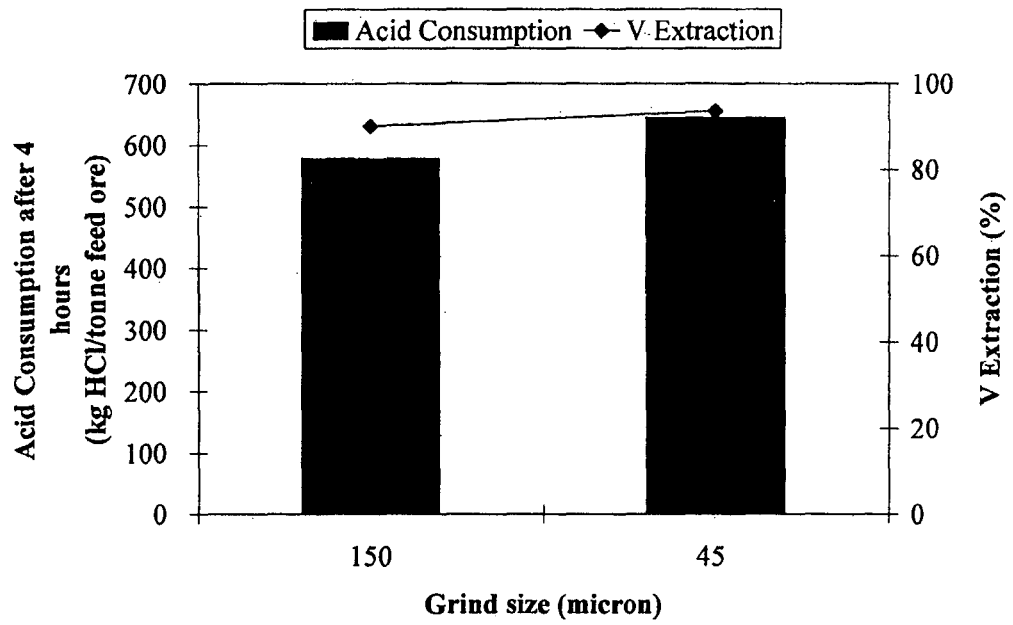
FIG. 5 is a graph of the effect of grind size and acid consumption on the extraction of vanadium.

The leaching of the $P_{80}$ 150 μm concentrate consumed comparatively less acid in comparison to leaching of the $P_{80}$ 45 μm concentrate, see FIG. 5. At a $P_{80}$ of 150 μm it involves a reduction, not only in the reagent costs but also the grinding cost. It is understood that the grinding cost increases exponentially with the decrease in the grind sizes. Subsequent tests were conducted using $P_{80}$ 150 μm concentrate.

Figure 6:
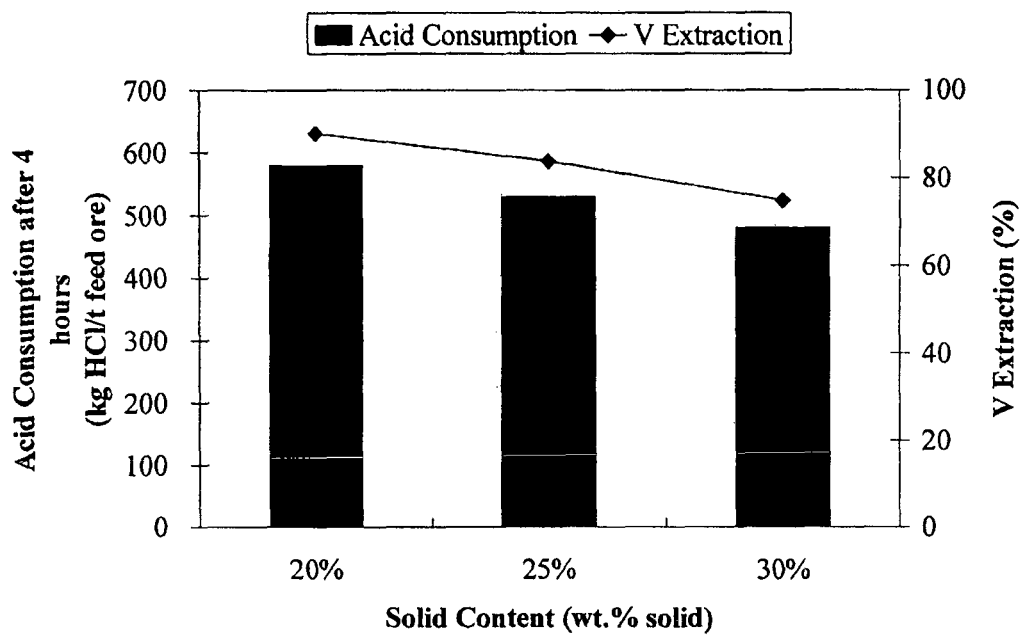
FIG. 6 is a graph of the effect of pulp density and acid consumption on the extraction of vanadium.
Figure 7:
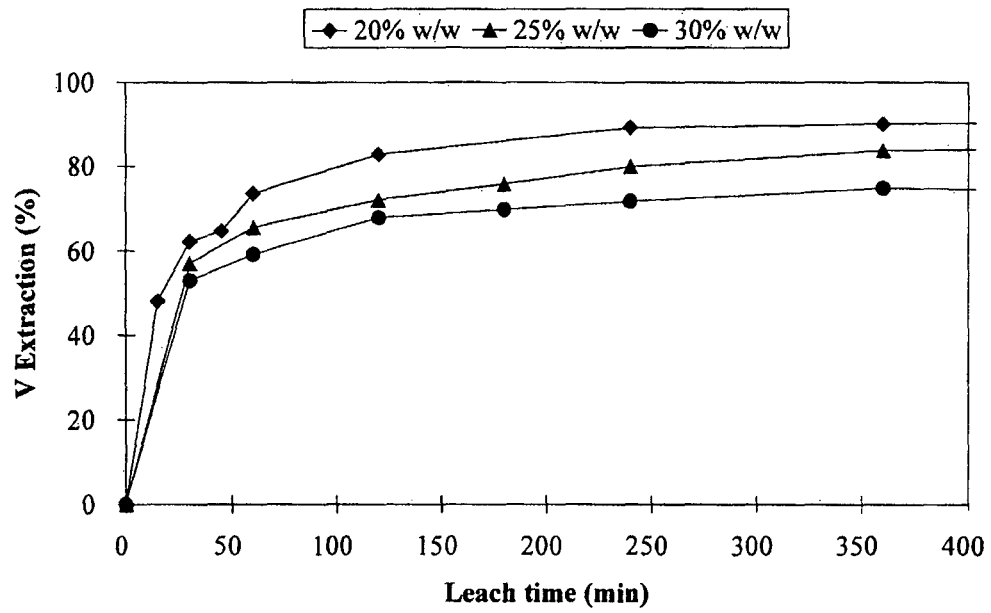
FIG. 7 is a graph of the effect of pulp density on the extraction of vanadium.
Figure 8:
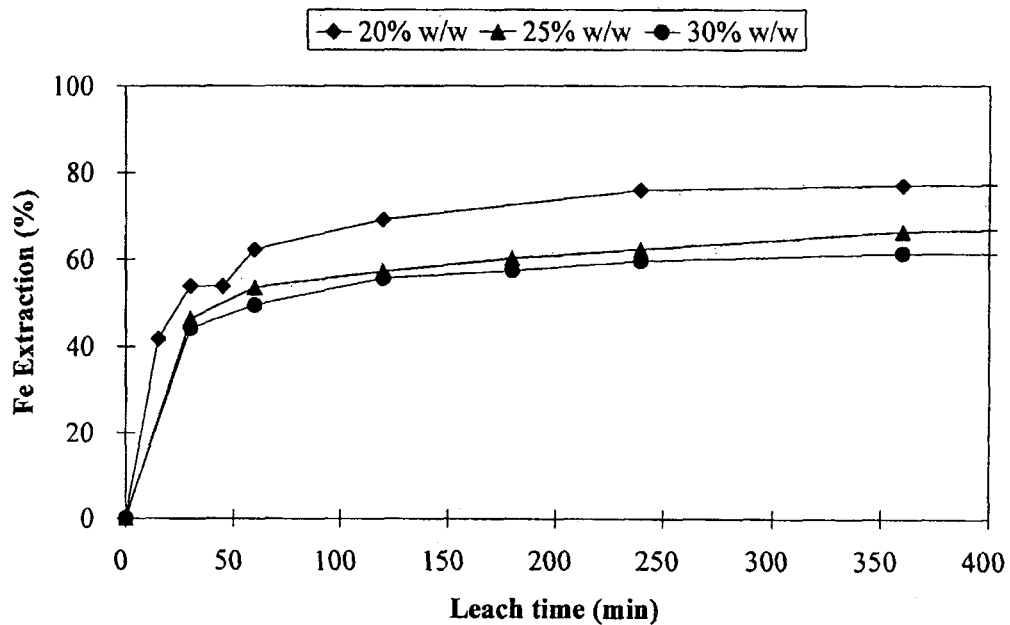
FIG. 8 is a graph of the effect of pulp density on the extraction of iron.
Figure 9:
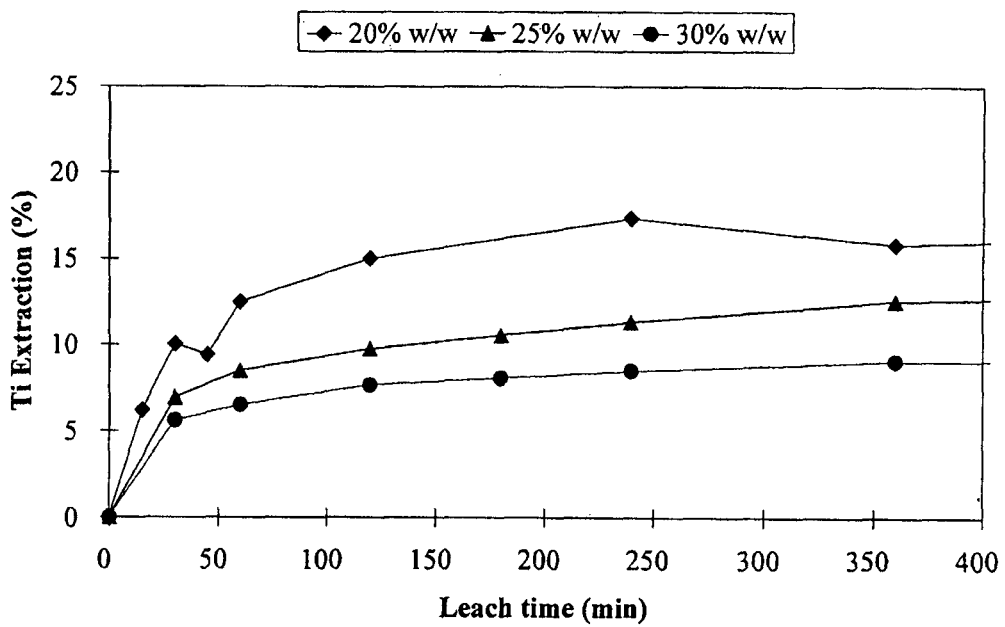
FIG. 9 is a graph of the effect density on the extraction of titanium.

An increase in the pulp density from 20 wt. % solid to 30 wt. % solid reduced the acid consumption from 579 kg HCl/tonne feed ore to 480 kg HCl/tonne feed ore, as shown in FIG. 6. Despite this, the vanadium extraction decreased from 90% to 75%, as shown in FIG. 7. Similarly, the iron extraction also decreased from 77% to 61%, as shown in FIG. 8. A decrease in the titanium extraction was also observed, as shown in FIG. 9.

Figure 10:
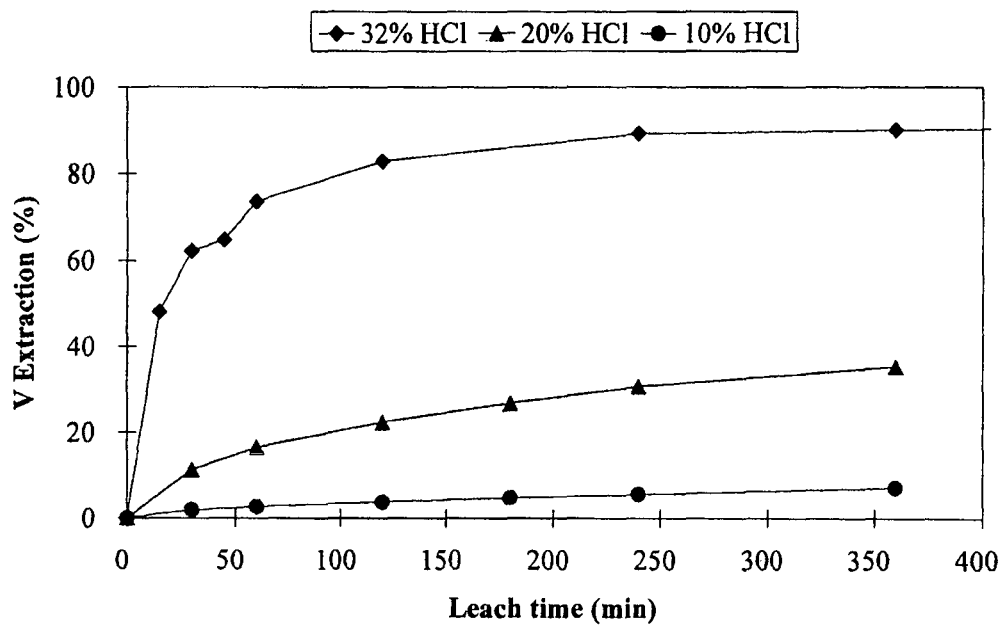
FIG. 10 is a graph of the effect of HCl acidity on the extraction of vanadium.
Figure 11:
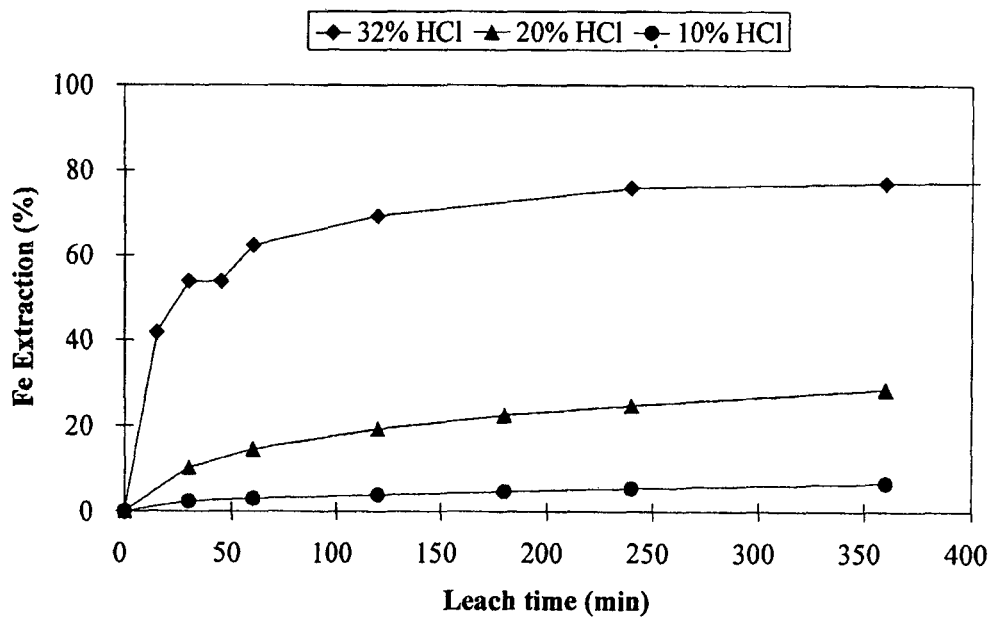
FIG. 11 is a graph of the effect of HCl acidity on the extraction of iron.
Figure 12:
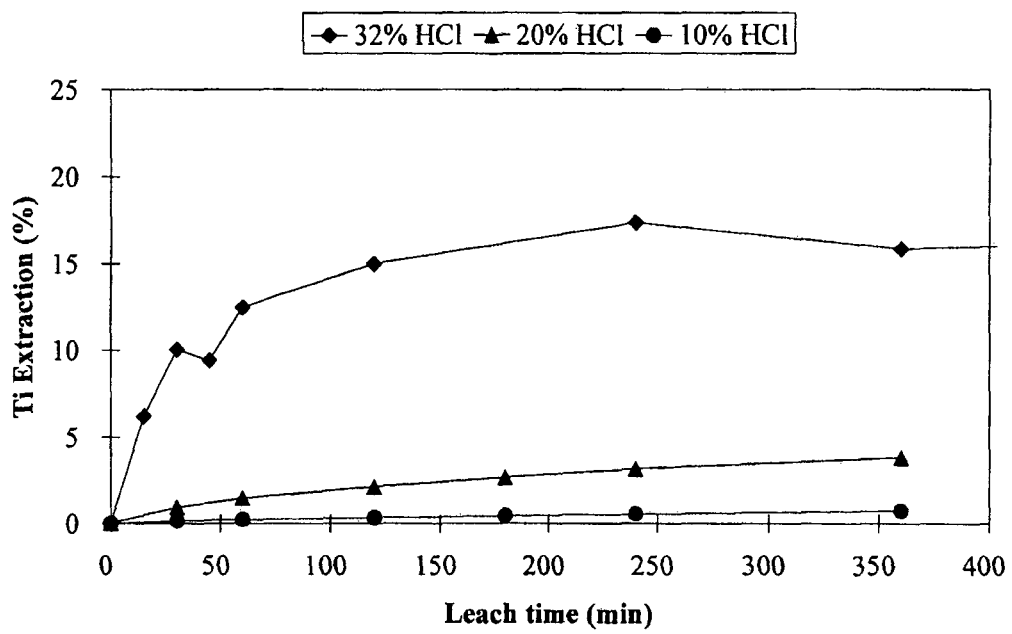
FIG. 12 is a graph of the effect of HCl acidity on the extraction of titanium.

The effect of HCl concentration on the vanadium extraction was also been investigated. A drastic decrease in the vanadium extraction was observed, following the decrease in the HCl concentration. Similarly, the iron and titanium extraction also decreased accordingly, as shown in FIGS. 10, 11 and 12, respectively.

The poor extraction efficiencies are understood to be attributable to the relatively low acid strength in the solution, resulting in the leach proceeding very slowly. It is envisaged that heating the solution to 80° C. may promote the dissolution of iron and vanadium, increasing thereby the leach kinetics. Heating of the solution to 80° C. is understood to have improved vanadium extraction. A vanadium extraction at 97.5% has been successfully achieved using 20 wt. % HCl at 80° C.

Figure 13:
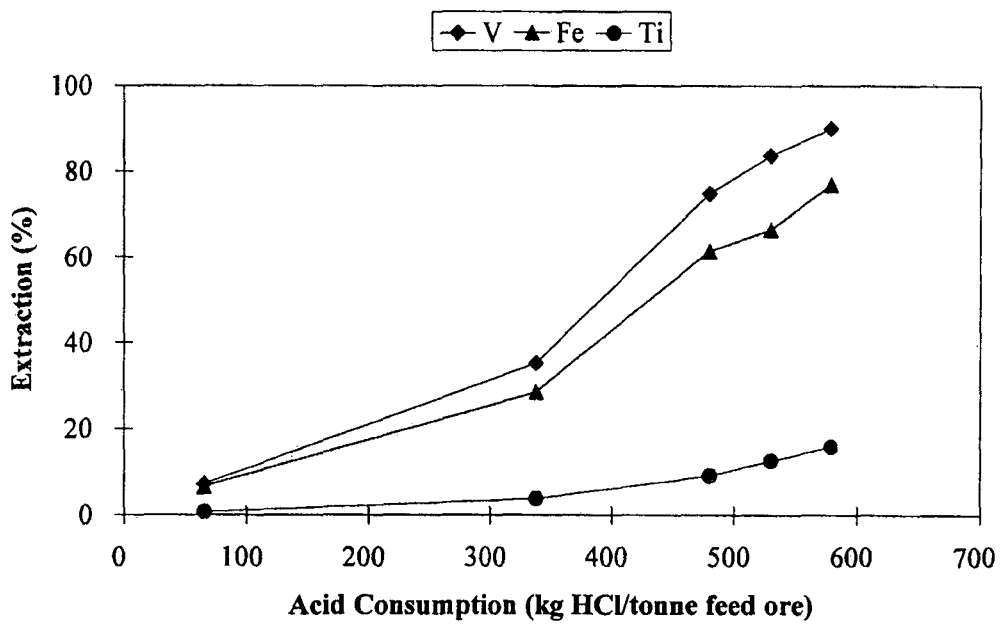
FIG. 13 is a graph of the effect of acid consumption on the extraction of vanadium, iron and titanium.

A plot of extraction versus acid consumption was developed. The result is shown in FIG. 13. A strong correlation is seen between the acid consumption and extraction. To achieve a vanadium extraction greater than 90% about 579 kg HCl/tonne of feed ore is required.

A high dissolution of iron is required to achieve a high extraction of vanadium. This is understood to be due to the locking of vanadium with titanomagnetite.

The acid is consumed to attack the iron, unlocking the vanadium to promote its dissolution.

Figure 14:
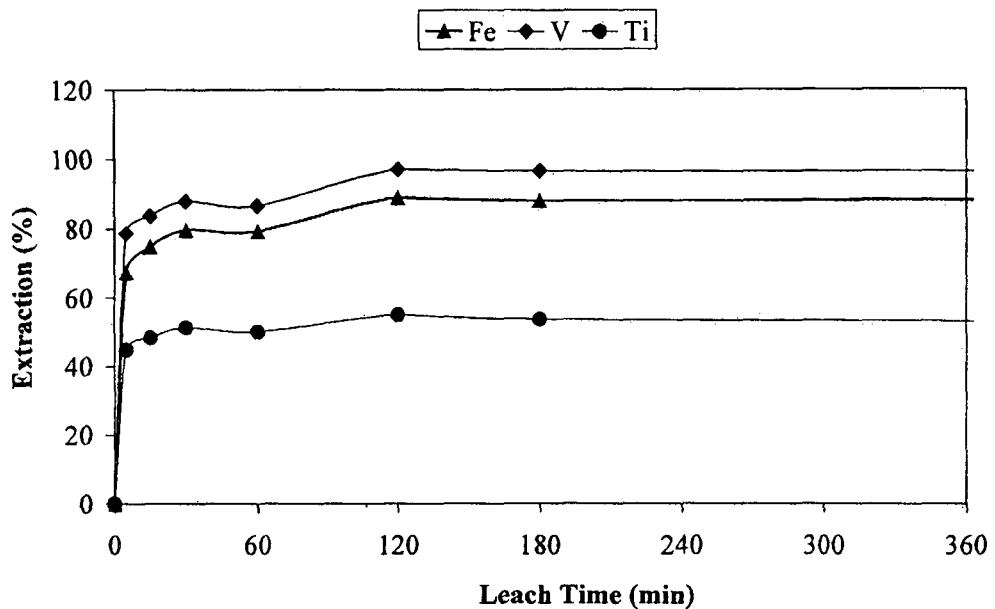
FIG. 14 is a graph of the extraction of vanadium, iron and titanium for a cobbing concentrate generated from the use of high pressure grinding rolls (HPGR).

A separate test was conducted to study the amenability of a cobbing concentrate (−1 mm) generated from the use of high pressure grinding rolls (HPGR) to acid leaching. This test aimed to investigate the beneficial effect of HPGR processing, as well as the possibility of eliminating the need for fine grinding. The leaching was conducted at 80° C. and pulp density of 20 wt. %. Concentrated HCl was used as the lixiviant. The reaction was allowed to take place for 6 hours. The leaching result is shown in FIG. 14.

The leach kinetics increased with increasing leach time and reached equilibrium after 120 min. At 120 min about 97% of the vanadium was extracted. There was also 89% of iron and 55% of titanium being co-extracted. No apparent change in the extraction efficiency for iron, titanium and vanadium was observed after 120 min. However, the acid consumption increased from 596 kg HCl/tonne feed ore to 772 kg HCl/tonne feed ore. The loss in acid is attributed to evaporation and/or being consumed to leach the remaining gangue minerals.

In comparison to the leach performance of the $P_{80}$ 45 μm and 150 μm concentrates, slower leach kinetics were observed with the −1 mm concentrate. This is expected since the $P_{80}$ 45 μm and 150 μm concentrates have higher surface area to volume ratio than that of −1 mm concentrate. While the fastest leach kinetics were achieved at $P_{80}$ 45 μm, it is important to note that the grinding power increases exponentially at finer grind sizes.

The amount of acid consumed by the −1 mm concentrate was comparable to that of $P_{80}$ 45 μm and 150 μm concentrates. It is expected that the −1 mm concentrate may consume higher amount of acid since it contained a higher level of gangue minerals than that in the $P_{80}$ 45 μm and 150 μm concentrates. The acid consumption is understood to be governed by the leaching of iron.

These results indicate that for some ore types, ball milling may be excluded from the method of the present invention. The elimination of ball milling is expected to lead to a reduction in the capital and operating expenditure.

A screening test was conducted to find the best performed extractant for the solvent extraction of vanadium. The extractants tested included:

20% v/v Cyanex 272™/80% v/v kerosene,
20% v/v Cyanex 923™/80% kerosene (Cyanex 923™) and
20% v/v DEHPA/15% v/v TBP/65% kerosene (TBP/DEHPA).

Amongst them, Cyanex 923™ gave the best extraction of vanadium. The Cyanex 923™ extracted a cumulative 75% vanadium. The Cyanex 272™ and TBP/DEHPA only extracted a cumulative 39% and 48% vanadium, respectively.

Co-extraction of iron was observed. The Cyanex 923™ extracted a cumulative 99% iron.

Similarly, TBP/DEHPA also produced a cumulative extraction of 99% iron. By contrast, Cyanex 272™ only extracted a cumulative 94% iron. Since the vanadium is co-extracted with iron, it indicated that a selective stripping would be needed to separate the vanadium from iron.

A test work programme was designed to explore the use of Cyanex 923™ as the sole extractant for the extraction of iron, titanium and vanadium. Cyanex 923™ was chosen because it was demonstrated to be capable of extracting vanadium without the need for the pre-removal of iron.

Figure 15:
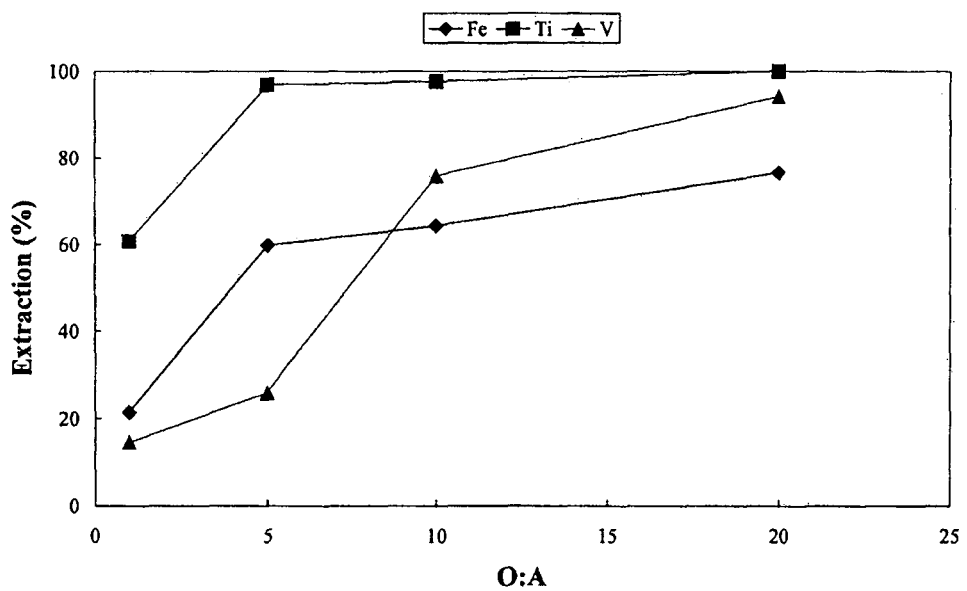
FIG. 15 is a graph of the effect of the effect of O:A ratio on the extraction efficiency of iron, titanium and vanadium by 20% v/v Cvanex 923™/80% v/v kerosene.

The solvent extraction test programme was conducted using 20% v/v Cyanex 923™ in 80% v/v kerosene at, A:O ratios of 1:1, 1:5, 1:10, 1:20. As shown in FIG. 15, the best performance was observed at an A:O ratio of 1:20. This is expected because an increase in the A:O ratio would increase the number of sites available for iron, titanium and vanadium to be loaded onto the organic.

Titanium was loaded more readily onto Cyanex 923™ in comparison to iron and vanadium. Complete extraction of titanium was achieved at an A:O ratio of 1:20. It is important to note that vanadium can be effectively loaded onto the organic even in the presence of significant amount of iron in solution. At an A:O ratio of 1:20, about 90% of the vanadium was also loaded onto the organic with 61% of the iron being co-extracted.

This option not only uses a single extractant but also eliminates the need for extra oxidant addition for the re-oxidation of Fe(II) to Fe(III).

The results showed that a stable emulsion was formed. Moreover, a third phase was observed during the phase separation. A modifier such as isodecanol can be added to prevent the emulsion and third phase formation.

It is envisaged that changing the volumetric ratio of Cyanex 923™ to kerosene may also help to resolve these problems. Additionally, it is further envisaged that the introduction of a filtration step prior to solvent extraction, so as to remove undissolved solids, would reduce the impact of emulsion formation.

These tests aimed to determine if selective stripping of vanadium can be achieved from the metal loaded organics, and to evaluate the ability of the extractant to be regenerated for reuse. The main, focus is to identify the best stripping solution to be used for separating vanadium from iron. It is not designed to optimise the stripping efficiency of vanadium and iron.

Figure 16:
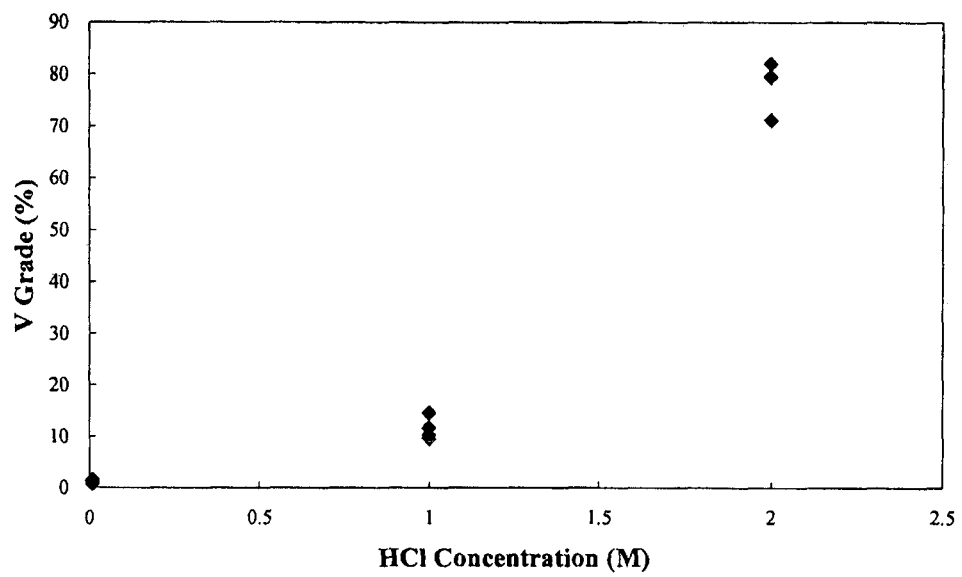
FIG. 16 is a graph of the effect of HCl on the stripping of vanadium.

The Cyanex 923™, which has been loaded with iron and vanadium, was used as the feed solution for the stripping test. Two stripping solutions at 2M HCl and 1M HCl were evaluated for the stripping of vanadium, as shown in FIG. 16.

Figure 17:
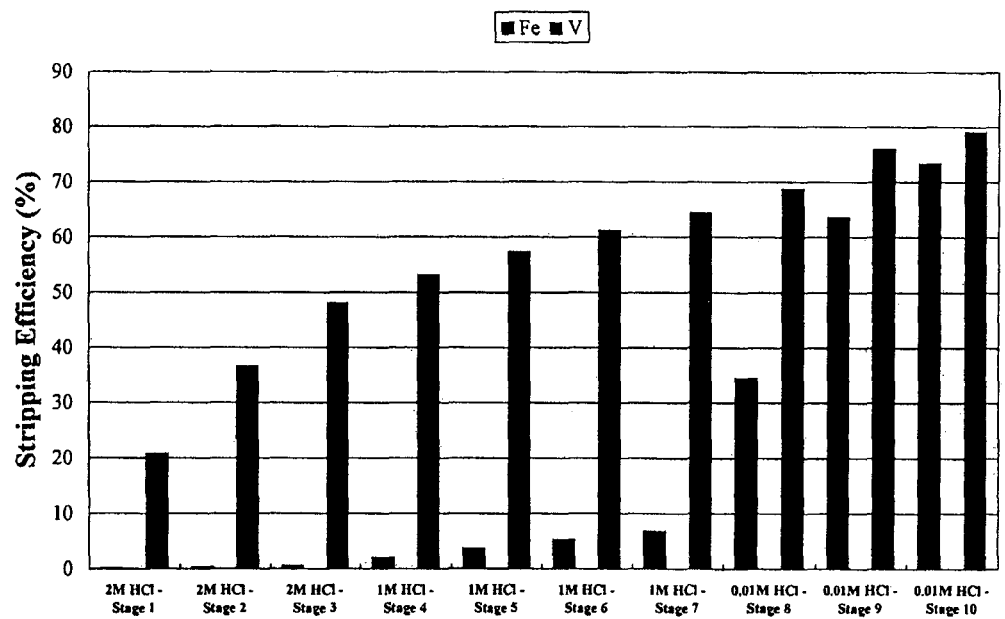
FIG. 17 is a graph of the effect of HCl acidity on the % stripping efficiency of iron and vanadium.

The vanadium was initially stripped from the organic followed by the stripping of iron using 0.01M HCl. The combined results are represented conveniently in FIG. 17.

Stripping of vanadium by 2M HCl at an A:O ratio of 2:1 produced a vanadium solution with an average purity of 76%. When the stripping test was performed using 1M HCl at an A:O of 1:1, the selectivity between vanadium and iron decreased drastically. It yielded a vanadium solution with average purity of 12%.

Subsequently, when the loaded organic was mixed with 0.01M HCl at an A:O of 1:1, it generated an iron solution with a purity of 99%.

A stripping test was also conducted on the Cyanex 923™ which has been loaded with 55% iron, 97% titanium and 70% vanadium. In this test, the stripping of vanadium was performed using a HCl solution at 4M HCl, 2.5M HCl and 2M HCl. It aimed to evaluate if the purity of the vanadium solution can be improved with increasing the acidity of the stripping solution.

Following the stripping of vanadium, the loaded organic was mixed with 0.01M HCl for the recovery of the iron.

When the loaded organic was mixed with 4M HCl at an A:O ratio of 3:1, the vanadium was stripped from the loaded organic, producing a vanadium solution with a purity of 95%.

Subsequently, mixing of the loaded organic with 0.01M HCl-produced an iron solution with a purity of 99%.

The test results clearly demonstrated that the vanadium can be selectively separated from iron.

The purity of the vanadium solution can be tuned by manipulating the acidity of the stripping solution.

A separate test work programme, conducted using the sole extractant of Cyanex 923™, showed that the vanadium, titanium and iron can be loaded efficiently on the extractant without the requirement pre-treatment.

The extraction efficiencies of iron, titanium and vanadium increased as the A:O ratio increased from 1:1 to 1:20. At an A:O ratio of 1:20, complete extraction of titanium was achieved with about 90% of vanadium and 61% of iron being co-extracted.

Stripping test performed on metals loaded Cyanex 923™ showed that the vanadium can be selectively stripped from the organic using HCl at a concentration 2-4 M. Depending on the acidity of the stripping solution, a vanadium solution with purity of 76% to 95% can be produced. An iron solution with a purity of 99% can be recovered from the loaded organic using 0.01M HCl as the stripping solution.

Further solvent extraction test work was conducted using the HPGR product described hereinabove. The leach slurry was filtered to remove the residue solid before subjected to the solvent extraction.

Cyanex 923™ was used the extractant. As described immediately above, this extractant has been previously found to extract iron, vanadium and titanium effectively. The extraction was carried out using 40 vol. % Cyanex 923™ in 60 vol. % kerosene at an O:A ratio of 1:1, 5:1, 8.5:1, 9:1, 10:1, and 12.5:1.

Figure 18:
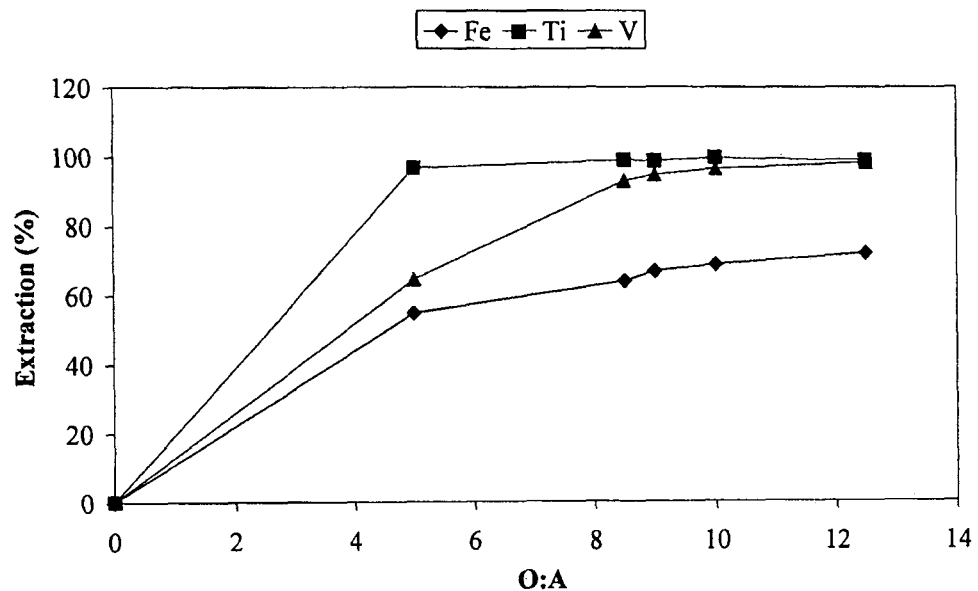
FIG. 18 is a graph of the effect of organic to aqueous (O:A) ratio on the extraction efficiency of iron, titanium and vanadium by 40% v/v Cyanex 923™/60% v/v kerosene.
Figure 19:
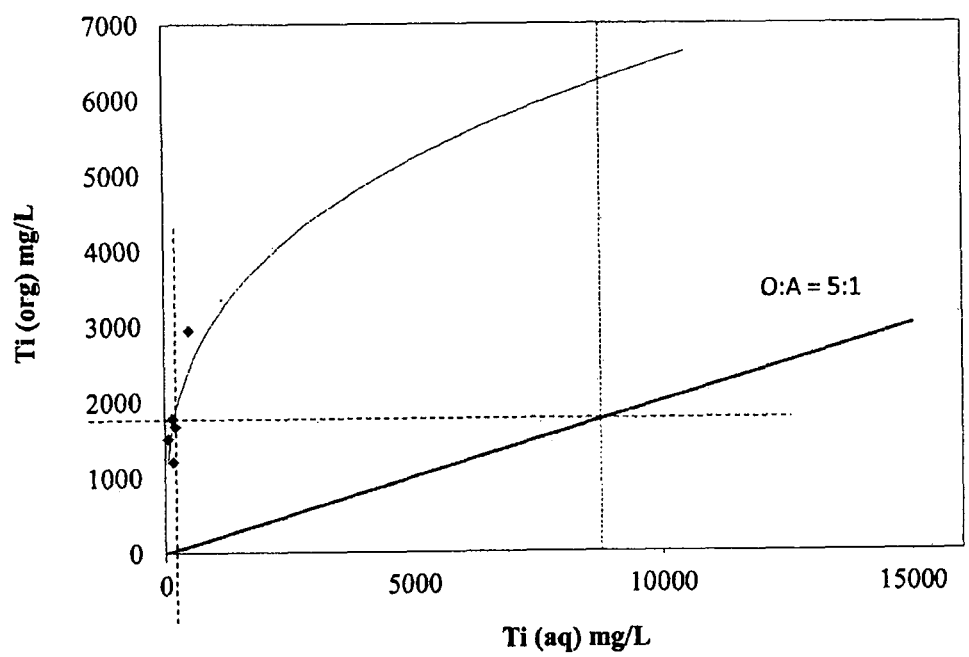
FIG. 19 is a McCabe Thiele diagram for extraction of titanium at an O:A of 5:1.
Figure 20:
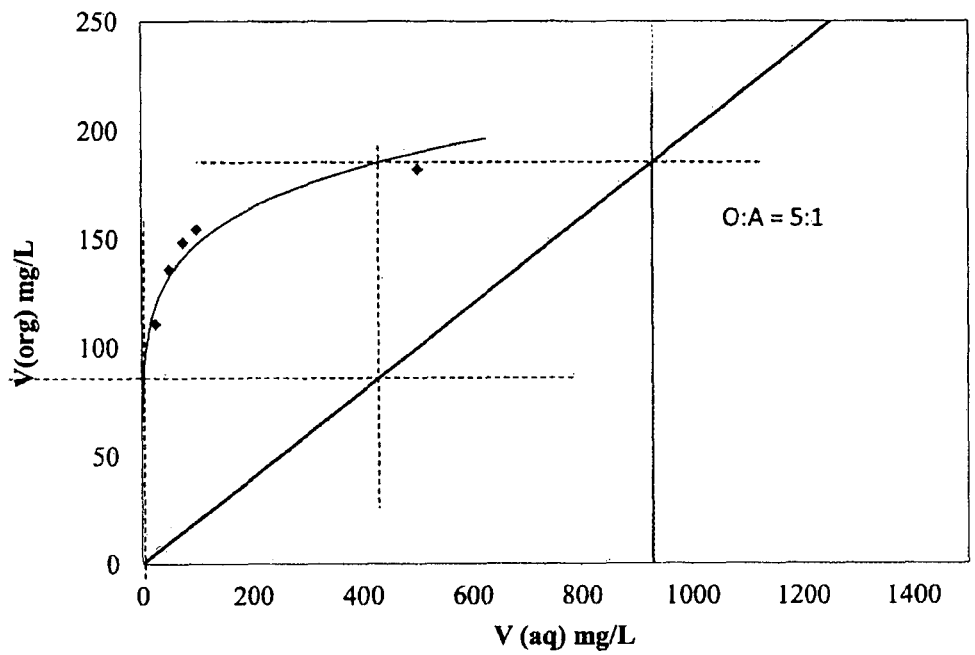
FIG. 20 is a McCabe Thiele diagram for extraction of vanadium at an O:A of 5:1.
Figure 21:
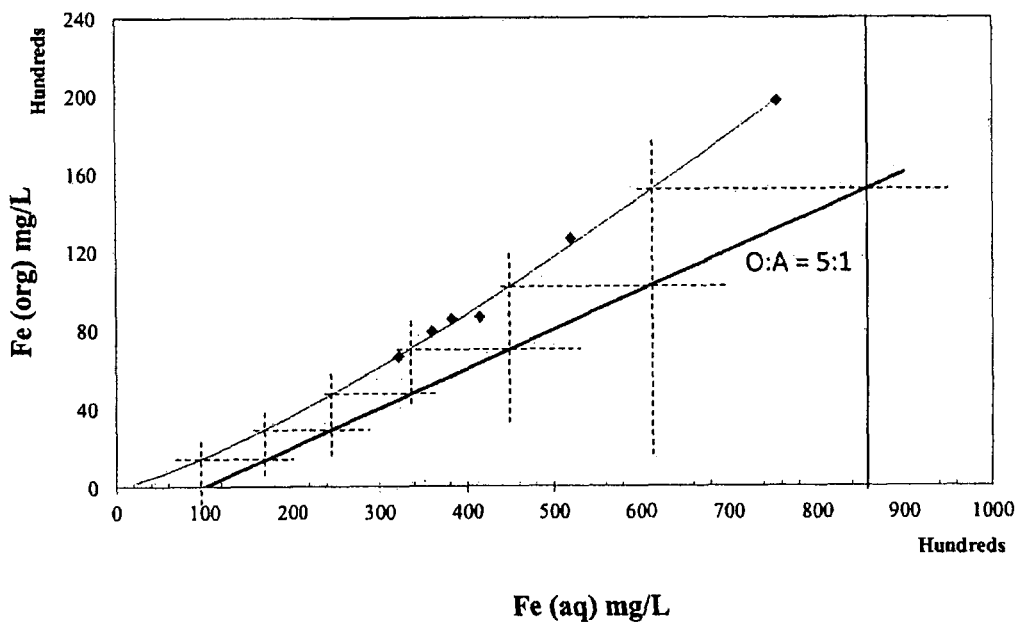
FIG. 21 is a McCabe Thiele diagram for extraction of iron at an O:A of 5:1.
Figure 22:
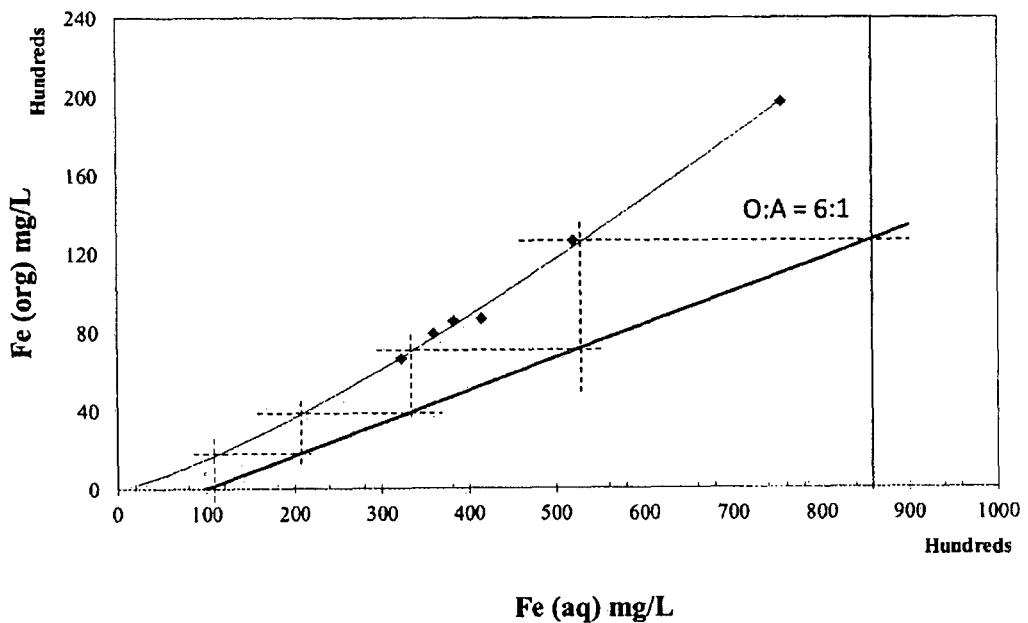
FIG. 22 is a McCabe Thiele diagram for extraction of iron at an O:A of 6:1.
Figure 23:
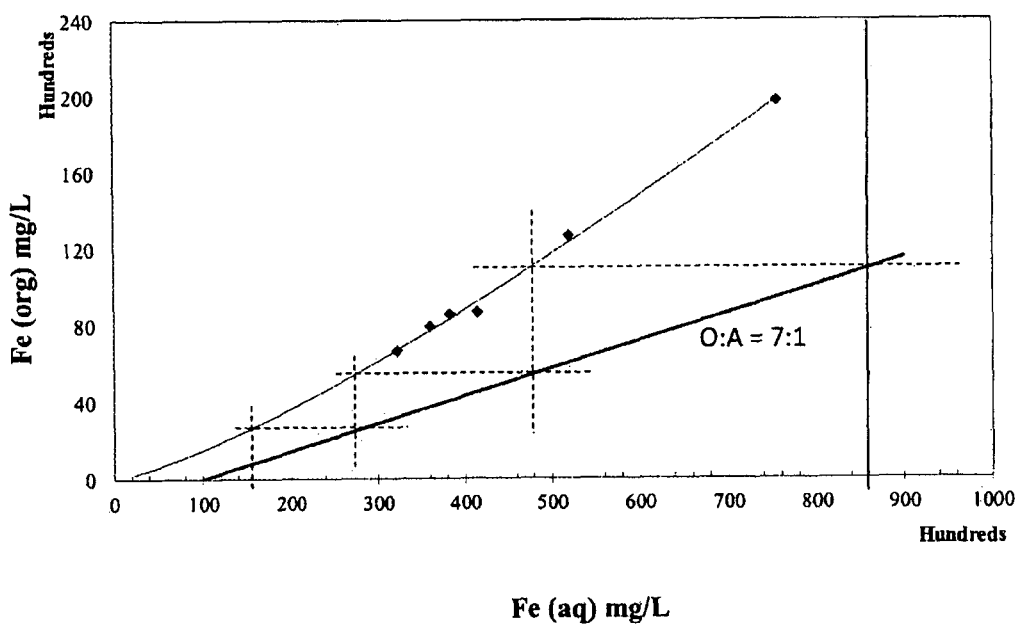
FIG. 23 is a McCabe Thiele diagram for extraction of iron at an O:A of 7:1.
Figure 24:
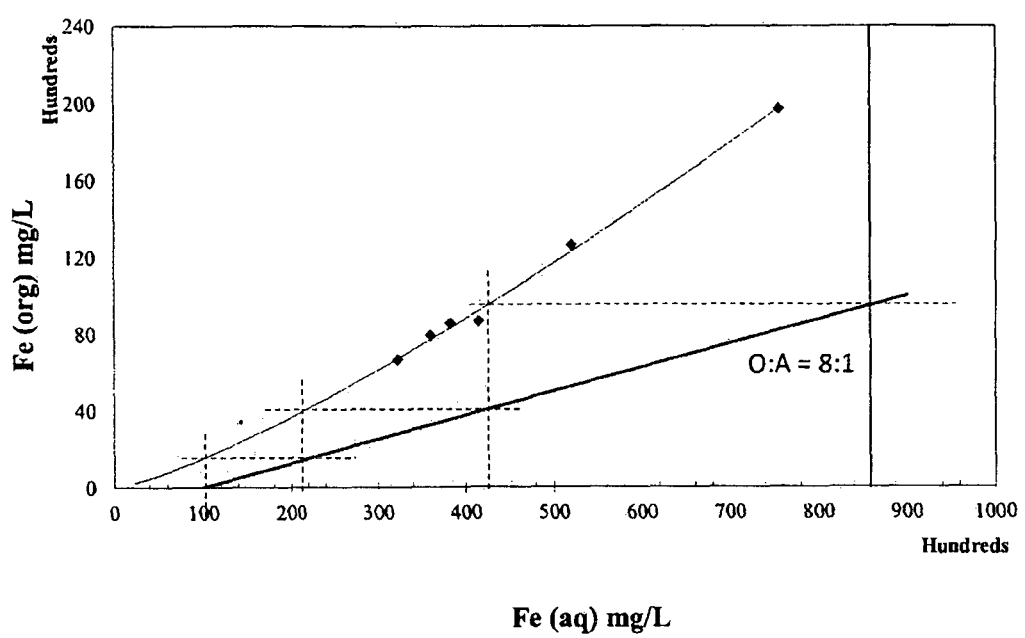
FIG. 24 is a McCabe Thiele diagram for extraction of iron at an O:A of 8:1.

As shown in FIG. 18, the extraction of vanadium, iron and titanium increased with the O:A ratio. This is attributed to the increase in the organic concentration at higher O:A ratio, improving the number of adsorption sites for the loading of iron, titanium and vanadium onto Cyanex 923.

McCabe Thiele diagrams were constructed to determine the number of stages required for the extraction of vanadium, iron and titanium. These are illustrated in FIGS. 19 to 24. At an O:A of 5:1, it was determined that titanium can be extracted efficiently in a single stage of contact. Complete extraction of vanadium was achieved after two stages of contact. For iron, it required 6 stages of contact to achieve an extraction of 88%.

Modifications and variations such as would be apparent to the skilled addressee are considered to fall within the scope of the present invention.

The invention claimed is:

1. A method for extraction and recovery of vanadium from its ores, the method comprising the steps of:
   (i) acid leaching of an ore containing vanadium, titanium and iron to extract vanadium and iron into solution and to form a solid residue containing titanium;
   (ii) passing said solution and said solid residue of leach step (i) to a solid/liquid separation step;
   (iii) passing a liquid product of separation step (ii) to a solvent extraction step in which vanadium and iron are extracted into an organic extractant from that liquid product;
   (iv) passing a loaded organic extractant produced in step (iii) to a stripping step in which acid is used to selectively and sequentially strip the vanadium and iron from the organic extractant;
   (v) passing the vanadium containing strip solution of step (iv) to a recovery step; and wherein the acid leaching is conducted in the range of about 25° C. to 80° C. under atmospheric pressure.

2. The method according to claim 1, wherein the acid leaching of step (i) is conducted using hydrochloric acid.

3. The method according to claim 2, wherein the concentration of hydrochloric acid is within the range of about 20% to 32% w/w.

4. The method according to claim 1, wherein the residence time of the acid leaching is between about 30 to 360 minutes.

5. The method according to claim 1, wherein a solids content during acid leaching is about 20% w/w.

6. The method according to claim 1, wherein the organic extractant of step (iii) contains a phosphine oxide.

7. The method according to claim 6, wherein the extractant comprises about 40% v/v phosphine oxide and 60% v/v organic solvent.

8. The method according to claim 1, wherein the aqueous to organic ratio during the solvent extraction step (iii) is between about 1:1 to 1:20.

9. The method according to claim 1, wherein the aqueous to organic ratio during the solvent extraction step (iii) is about 1:5.

10. The method according to claim 1, wherein the stripping step (iv) is conducted in a counter-current manner whereby vanadium is stripped from the loaded organic extractant prior to the stripping of iron from that solution.

11. The method according to claim 1, wherein the acid used in the strip of step (iv) is hydrochloric acid.

12. The method according to claim 11, wherein the hydrochloric acid is provided in a concentration of between about 2 to 4 M when stripping vanadium.

13. The method according to claim 11, wherein the hydrochloric acid is provided in a concentration of about 0.01 M when stripping iron.

14. The method according to claim 1, wherein the purity of a vanadium solution produced in the recovery step (v) is between about 76% to 95%.

15. The method according to claim 1, wherein the purity of an iron solution produced in the recovery step (v) is about 99%.

16. A method for extraction and recovery of vanadium from its ores comprising the steps of:

(i) acid leaching of an ore containing vanadium, titanium and iron to extract vanadium and iron into solution and to form a solid residue containing titanium;
(ii) passing said solution and said solid residue of leach step (i) to a solid/liquid separation step;
(iii) extracting iron and vanadium from a liquid product of separation step (ii);
(iv) then stripping vanadium from an organic extractant formed in step (iii) to form a vanadium-containing strip solution;
(v) passing the vanadium-containing strip solution of step (iv) to a recovery step; and
wherein the acid leaching is conducted in the range of about 25° C. to 80° C. under atmospheric pressure.

17. The method of claim 1, wherein greater than 0 and less than 20% by weight of the titanium is extracted into the solution after step (i).

18. The method of claim 16, wherein greater than 0 and less than 20% by weight of the titanium is extracted into the solution after step (i).

19. The method of claim 1, wherein 16-19% by weight of the titanium is extracted into the solution after step (i).

20. The method of claim 18, wherein 16-19% by weight of the titanium is extracted into the solution after step (i).

* * * * *